United States Patent [19]

Krongelb et al.

[11] Patent Number: 4,737,877
[45] Date of Patent: Apr. 12, 1988

[54] STRUCTURE TO PROVIDE OPTICAL AND CAPACITIVE CONTRAST ON MAGNETIC RECORDING DISK

[75] Inventors: Sol Krongelb, Katonah; Lubomyr T. Romankiw, Briarcliff Manor; Robert A. Scranton; David A. Thompson, both of South Salem, all of N.Y.

[73] Assignee: International Business Machines Corporation, Armonk, N.Y.

[21] Appl. No.: 861,655

[22] Filed: May 5, 1986

[51] Int. Cl.⁴ .................... G11B 5/82; G11B 13/00
[52] U.S. Cl. .................... 360/135; 360/77; 369/14; 369/275; 369/284
[58] Field of Search .......... 360/135, 131–134, 360/77; 369/14, 275, 94, 111, 276, 279, 284, 286; 428/694, 900, 64–65; 346/76 L, 135.1

[56] References Cited

U.S. PATENT DOCUMENTS

| | | | |
|---|---|---|---|
| 3,460,118 | 8/1969 | Woolfolk | 340/174.1 |
| 4,237,506 | 12/1980 | Manly | 360/135 |
| 4,351,010 | 9/1982 | Arai | 360/135 |
| 4,397,751 | 8/1983 | Dickstein et al. | 360/135 X |
| 4,417,290 | 11/1983 | Tanaka et al. | 360/131 |
| 4,684,547 | 8/1987 | Di Stefano et al. | 156/632 |

FOREIGN PATENT DOCUMENTS

| | | | |
|---|---|---|---|
| 0015305 | 2/1977 | Japan | 360/131 |
| 2096647 | 10/1982 | United Kingdom | 360/131 |

OTHER PUBLICATIONS

Bothun, "Three-Film Laminate Substrate for Magnetic Disk," IBM TDB, Feb. 1976, vol. 18, No. 9, p. 3027.
Koshino et al., "Optical Method of the Head Positioning in Magnetic Disk Systems", IEEE Trans. of Mag., Sep. 1980, MAG 16, pp. 631–633.
Acosta et al., "Floppy Disc Embossing for Servo Applications," IBM TDB, vol. 21, No. 10, pp. 4259–4260, Mar. 1979.
Gruss et al., "Servo System for Magnetic Recording Based on Time Comparison," Jul. 1980, vol. 23, No. 2, pp. 787–789.
Cannon, "Optical or Capacitive Digital Servos for Record Members," IBM TDM, Feb. 1977, vol. 19, No. 9, pp. 3303–3304.
Potter, R. I., "Capacitive Servoing on Topgraphic Variations", IBM TDB, vol. 21, No. 6, Nov. 1978, p. 2506.
Comstock et al., "Servo Disk with Overlapping Servo and Data Tracks", Nov. 1973, IBM TDB, vol. 16, No. 6, p. 1818.
Tsu, "Preparation of Adherent Thin Magnetic Films by Chemical Reduction," Oct. 1959, vol. 2, No. 3, p. 36.

*Primary Examiner*—John H. Wolff
*Assistant Examiner*—David J. Severin
*Attorney, Agent, or Firm*—Alexander Tognino; John J. Goodwin

[57] ABSTRACT

A magnetic recording disk is formed on a rigid aluminum substrate coated with a polymeric dielectric layer. A thin film metallic position-indicating track is applied to the upper surface of the dielectric layer. The dielectric material is coated with a magnetic recording medium. A thin film of aluminum forms the patterned capacitive and optically reflective track. The dielectric layer is composed of a very similar material to the matrix material in the magnetic recording medium.

The disk can be flexible or floppy and it is not necessary to have the extra dielectric layer in such a case, where the substrate is a dielectric.

4 Claims, 1 Drawing Sheet

STRUCTURE TO PROVIDE OPTICAL AND CAPACITIVE CONTRAST ON MAGNETIC RECORDING DISK

BACKGROUND OF THE INVENTION

1. Field of the Invention

The present invention relates to magnetic recording and more particularly to position indicating structures on the disk.

2. Description of the Prior Art

Bothun, "Three-Film Laminate Substrate for Magnetic Disk" IBM Technical Disclosure Bulletin Vol. 18, No. 9 p 3027 (Feb. 1976) shows a disk with a polyethylene terephthalate (Mylar) film substrate coated with continuous aluminum foil, outer layers carrying magnetic coatings on their surfaces.

Koshino et al "Optical Method of the Head Positioning in Magnetic Disk Systems" IEEE Transactions on Magnetics MAG 16 pp631-633 (September 1980) describes an optically encoded magnetic recording medium with alternate colored and noncolored circular tracks on the anode-oxidized coating on the aluminum substrate just below the magnetic recording medium.

Acosta et al "Floppy Disc Embossing for Servo Applications" IBM Technical Disclosure Bulletin Vol 21, No. 10, p. 4259-4260 (March 1979) describes an embossed, spiral groove for electrostatic servo control with a magnetic-recording, floppy disk.

SUMMARY OF THE INVENTION

Thus, while the invention has been described with reference to preferred embodiments thereof, it will be understood by those skilled in the art that various changes in form and details may be made without departing from the scope of the invention.

In accordance with this invention a magnetic disk structure comprises a substrate with a medium carried upon the surface of the substrate. The substrate is coated with a layer of a dielectric material with the magnetic recording media being deposited upon the dielectric material. A position indicating track is formed on the disk. The position indicating track comprises a thin film located between the dielectric film and the magnetic recording medium whereby a capacitive servo track is provided between the medium and the dielectric layer.

Thus the medium is provided with a flat upper surface which is adapted to eliminate mechanical interference with the magnetic recording function by the capacitive servo track.

Preferably, the disk file is composed of a matrix and magnetic particles mixed together and the dielectric material is composed of a similar material to the matrix material.

Preferably, the substrate is composed of a rigid material. Alternatively, it can be composed of a flexible material such as a floppy disk.

In a magnetic recording disk structure with a substrate carrying a magnetic recording medium upon the surface of the substrate, the substrate is coated with a thin-film, position-indicating track on the substrate between the substrate and the magnetic recording medium. Thus a nonmagnetic servo track is provided beneath the medium and a flat upper surface of the medium is provided which is adapted to eliminate mechanical interference with the magnetic recording function by the servo track.

Preferably, the servo track comprises a capacitive servo track which is adapted to be detected by means of a capacitive sensor. An advantage of this invention is that the servo-control data on the disk disturbs or modulates the magnetic recording data in a read-record channel minimally. Previous servo data has been recorded by making patterns in the magnetic signal recording portions of the disk, causing mechanical discontinuities in the magnetic recording media. For example, in one case, the magnetic recording media was etched to form such servo control patterns. Such patterns of servo control recording reduce the bit storage density and/or increase the error rate, although the error rate can be minimized if the storage density is low enough that the bit patterns of the servo control signal become innocuous because they are small relative to the size of the magnetic recording data storage areas for a single bit of data.

Another advantage of this invention is that it does not increase the effective flying height of the magnetic recording head relative to the magnetic recording media, so that the magnetic recording resolution can be optimal.

A third feature of this structure is that it is compatible with existing media formulations as well as new magnetic media formulations, including matrices of polyurethane, and polymeric underlayers.

A fourth feature of this structure is that it provides the versatility of being compatible with servo read heads which operate on both the capacitive and the optical contrast principles. It should be understood that the term optical contrast is used here to denote both optical and other electromagnetic radiation to which the medium is transparent.

Thus infrared, or ultraviolet light or other radiation outside of the visual spectrum could be employed in principle.

A fifth advantage of this invention is that the critical head-to-disk interface is unchanged in that the new servo layer is buried below the magnetic recording layer so it does not affect lubrication, start-stop characteristics and glide height of the head.

The foregoing and other objects, features and advantages of the invention will be apparent from the more particular description of the preferred embodiments of the invention, as illustrated in the accompanying drawings.

BRIEF DESCRIPTION OF THE DRAWINGS

In the drawings, like elements are designated with similar reference numbers, and identical elements in different specific embodiments are designated by identical reference numbers.

DESCRIPTION OF THE PREFERRED EMBODIMENT

Figure 1:
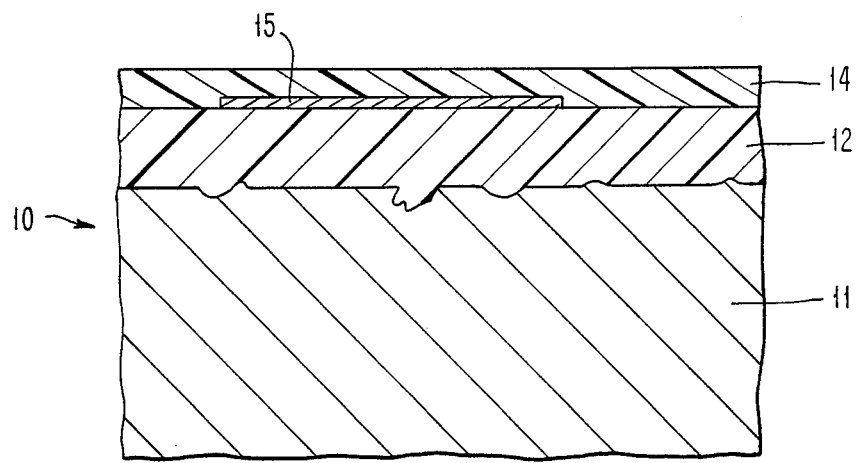
FIG. 1 shows a cross-section of a thin film magnetic recording disk carrying an optical and capacitive servo track located beneath the medium in accordance with this invention.

Referring to FIG. 1, a magnetic recording disk 10 includes a rigid aluminum disk 11 serving as a substrate coated with a layer of a polymeric, dielectric material 12. A thin film, metallic position-indicating track 15 is applied to the upper surface of the dielectric material 12 on the substrate 11. The dielectric material 12 and the track 15 are coated with a magnetic recording medium 14. The thin film 15 of a metal such as aluminum forms the patterned capacitive and optically reflective track. The dielectric layer 12 is preferably composed of a very similar material to the matrix of the magnetic recording medium 14.

The disk 10 can be flexible and it is not necessary to have the dielectric layer 12 in every case. A flexible disk is especially attractive if the substrate 11 is composed of an insulating material or a poor conductor. Suitable dielectric materials for substrate 11 include Mylar polyethylene terephthalate, acetate, silicon, ceramic materials or glass.

FIG. 1 shows the cross-section of a finished disk 10. Above an aluminum alloy substrate 11 is deposited a thin film 12 of a dielectric having a thickness of from about 0.1 to 10 micrometers preferably and can be up to about 150 micrometers with a typical thickness of about 3 micrometers. The dielectric of film 12 can be composed of materials such as epoxy-phenolic resin, polyurethane, or polyimide. The purpose of layer 12 is to provide optical and capacitive (dielectric) contrast, which will facilitate reading of data stored either optically and/or capacitively.

Additionally, such a layer has been proposed by others to provide a smooth layer on the surface of the substrate 11. Provision of layer 12 can possibly eliminate the need for turning the substrate 11 on a milling machine or lapping machine to smooth the rough peaks (asperities) from the original surface of substrate 11. Preferably, the dielectric layer 12 is chosen to be compatible with the material comprising the magnetic media 14, in order to provide similar coefficients of expansion and contraction and to enhance adhesion of the two layers together.

EXAMPLE I

A disk medium 14 is composed of a particulate material (magnetic-oxide particles) dispersed in an epoxy-phenolic matrix. Accordingly, the dielectric is composed of an epoxy-phenolic preferably similar or identical to the matrix of medium 14 without the particles.

EXAMPLE II

A matrix for a magnetic medium 14 is composed of polyurethane carrying the magnetic medium particles. Correspondingly, the layer of polymeric dielectric 12 is composed of polyurethane.

EXAMPLE III

The media 14 is composed of a sputtered thin film. The media can be composed of a metal or sputtered iron oxide such as gamma iron oxide, $Fe_2O_3$, etc. The dielectric layer 12 is composed of polyimide because of its capacity to withstand high temperatures with little alteration of the chemical and electrical properties of the polyimide. The polyimide can be heated to 400 degrees C. during sputtering of the iron oxide media with substantially no measurable change in the composition or characteristics of the dielectric layer 12. The polyimide can be heated in air up to 400 degrees C. without damage.

The layer deposited on the dielectric layer 12 is a patterned thin metallic film 15 which preferably is composed of chromium. Film 15 is thick enough to insure the conductivity typical of a metallic film, say 0.01 micrometers. An alternative metal for film 15 is aluminum.

Patterning of the film is achieved by means of a subtractive technique such as sputter etching or wet chemical etching using a mask or the like to protect the portions of metal to be retained, or by means of an additive vacuum deposition technique such as sputtering or evaporation in conjunction with the well known lift-off techniques of depositing over a layer of resist which has openings where the pattern is to remain on the substrate. Film 15 is extremely thin, approximately the magnitude of the surface roughness on existing disks or less. This degree of roughness is that existing after buffing the top surface of film 14.

Preferably, layer 15 is from 0.005 to 0.1 micrometers thick (gross) and layer 14 is about from 0.1 to 3 micrometers thick (chosen for magnetic reasons.)

The film of magnetic media 14 is deposited in a standard manner, followed by the usual buffing and lubrication.

In the current state of the art of magnetic recording disk files, a magnetic recording head for reading and writing data magnetically is carried by a slider which flies over the magnetic recording media 14. In this case, the media is adapted to include capacitive or optical indicia which can be employed to indicate the physical locations on the disk to a capacitive and/or optical sensor or sensors on the slider, so that the magnetic recording media and head will not be required to include the location data required to operate the servo system which positions the slider and the heads it carries.

An advantage of this invention is that the servo-control data on the disk disturbs or modulates the magnetic recording data in a read-record channel minimally.

Another advantage of this invention is that it does not increase the effective flying height of the magnetic recording head relative to the magnetic recording media, so that the magnetic recording resolution can be optimal.

A third feature of this structure is that it is compatible with existing media formulations as well as new magnetic media formulations, including matrices of polyurethane, and polymeric underlayers.

A fourth feature of this structure is that it provides the versatility of being compatible with servo read heads which operate on both the capacitive and the optical contrast principles.

A fifth advantage of this invention is that the critical head-to-disk interface is unchanged in that the new servo layer is buried below the magnetic recording layer so it does not affect lubrication, start-stop characteristics and glide height of the head.

A primary requirement of a magnetic recording disk is that the position pattern should not interfere with the process of magnetic recording. The effects can be measured directly by observing the amplitude modulation of higher frequency magnetically recorded data by the position-signal pattern of the metallic film. The modulation sidelobes of the magnetic signal recorded and read on a structure similar to FIG. 1 were determined experimentally to be 28 db below the desired read signal amplitude. This low sidelobe amplitude was below the noise level of the wideband data channel. Its presence could be determined only by the use of a sweeping spectrum analyzer. This low level of amplitude modulation indicated that the position signal pattern will not interfere with the magnetic recording or reading of data. This experiment used a magnetic media having a thickness of 0.5 micrometers and a patterned film thickness of 0.025 micrometers. Furthermore, we note that the recording and playing of the very high frequency magnetic data, corresponding to the resolution limits of the media, takes place at the upper portion of the magnetic media (near the recording head) away from the patterned metallic film.

However, for extremely thin magnetic layers, and for very high resolutions, it may be required to isolate the magnetic media by separation of it farther from the position signal pattern. An alternate disk cross-section overcomes this problem.

Figure 2:
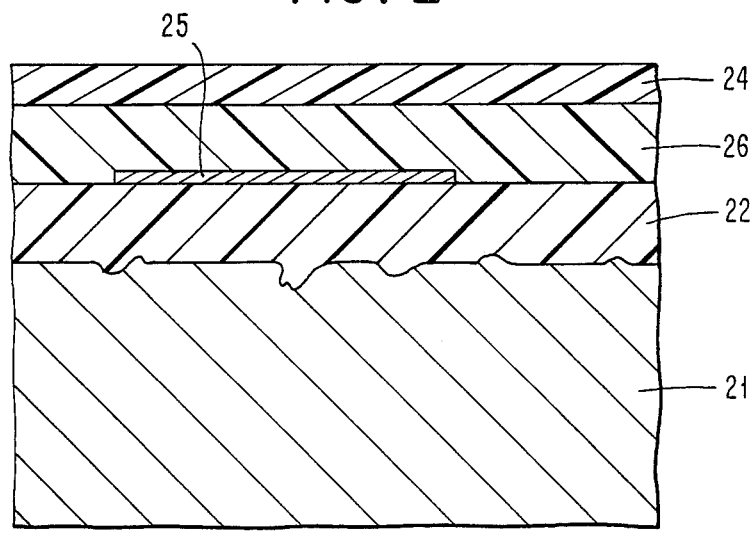
FIG. 2 shows a substrate carrying a dielectric layer with a thin film servo pattern on it. The servo pattern and the dielctric layer are coated in turn with another dielectric layer.

FIG. 2 shows a substrate 21 carrying a dielectric layer 22 with a thin film servo pattern 25 thereon. The servo pattern and layer 22 are covered with another dielectric layer 26 which in turn is covered with the magnetic film layer 24. In this way the magnetic layer is separated from the servo pattern layer which is advantageous because the dielectric layer 26 can further enhance the smoothness and adhesion of the magnetic medium 24. In the case of optical sensing of the servo pattern, the dielectric layer 26 can also enhance said optical contrast of the pattern.

What is claimed is:

1. A magnetic disk structure comprising:
   (a) a substrate
   (b) a flat layer comprising a dielectric material coated on said substrate,
   (c) a thin metallic film positioning-indicating servo track deposited on said upper surface of dielectric material said film having a thickness of about 0.025 micrometers and
   a magnetic recording medium deposited upon said position-indicating servo track said medium being provided with a flat upper surface and said recording medium having a thickness of about 0.5 micrometers.

2. A magnetic disk structure in accordance with claim 1 wherein
   said magnetic recording medium is composed of a matrix and magnetic particles mixed together, and
   said dielectric material is composed of a similar material to said matrix material.

3. A magnetic disk structure comprising:
   (a) a substrate having coated on its upper surface a layer composed of a film of a dielectric material
   (b) a position-indicating track comprising a thin metallic film located upon said upper surface of the dielectric material said film having a thickness of about 0.025 micrometers and providing capacitive contrast and
   (c) a magnetic recording medium layered upon said position-indicating track said medium being provided with a flat upper surface and said magnetic recording medium having a thickness of about 0.5 micrometers.

4. A magnetic disk structure comprising:
   (a) a substrate, said substrate comprising a rigid metallic material,
   (b) a first coating on the upper surface of said rigid metallic material,
   (c) a second coating on top of said first coating, said first and second coatings each comprising a dielectric material
   (d) a position-indicating track comprising a thin metallic film located between said dielectric coating on said upper surface of said first coating and said second coating said film having a thickness of about 0.025 micrometers
   (e) a magnetic recording medium deposited upon the upper surface of said second coating, said medium being provided with a flat upper surface, and said magnetic recording medium having a thickness of about 0.5 micrometers.

* * * * *